United States Patent
Kurian et al.

(10) Patent No.: US 12,107,967 B2
(45) Date of Patent: Oct. 1, 2024

(54) SYSTEM FOR AUTHENTICATING PEER-TO-PEER RESOURCE EXCHANGE USING NON-FUNGIBLE TOKENS

(71) Applicant: BANK OF AMERICA CORPORATION, Charlotte, NC (US)

(72) Inventors: Manu Jacob Kurian, Dallas, TX (US); David Smiddy, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 419 days.

(21) Appl. No.: 17/546,269

(22) Filed: Dec. 9, 2021

(65) Prior Publication Data
US 2023/0188357 A1 Jun. 15, 2023

(51) Int. Cl.
*H04L 9/32* (2006.01)
*H04L 9/08* (2006.01)
*H04L 9/40* (2022.01)

(52) U.S. Cl.
CPC .......... *H04L 9/3247* (2013.01); *H04L 9/0838* (2013.01); *H04L 63/0428* (2013.01)

(58) Field of Classification Search
CPC .. H04L 9/3247; H04L 9/0838; H04L 63/0428
USPC ........................................................ 713/176
See application file for complete search history.

(56) References Cited

U.S. PATENT DOCUMENTS

| | | | |
|---|---|---|---|
| 7,734,600 B1 | 6/2010 | Wise et al. | |
| 8,196,186 B2 | 6/2012 | Mityagin et al. | |
| 8,312,107 B2 | 11/2012 | Chapweske | |
| 8,495,746 B2 | 7/2013 | Fissel et al. | |
| 8,843,997 B1 | 9/2014 | Hare | |
| 9,563,480 B2 | 2/2017 | Messerli et al. | |
| 9,794,797 B2 | 10/2017 | Hoffberg | |
| 9,800,603 B1 | 10/2017 | Sidagni | |
| 10,938,567 B2 | 3/2021 | Martino et al. | |
| 11,240,025 B2 | 2/2022 | Wentz | |
| 11,363,069 B1* | 6/2022 | Becker | H04W 12/33 |
| 11,561,832 B2* | 1/2023 | Vijapur | G06F 9/30105 |
| 2012/0290427 A1 | 11/2012 | Reed et al. | |
| 2015/0178340 A1 | 6/2015 | Sidman | |
| 2017/0139736 A1 | 5/2017 | Messerli | |
| 2017/0228731 A1 | 8/2017 | Sheng et al. | |
| 2018/0232682 A1* | 8/2018 | Dravneek | G06F 9/5061 |
| 2019/0068365 A1* | 2/2019 | Wright | G06Q 20/4015 |
| 2019/0147431 A1* | 5/2019 | Galebach | H04L 9/3247 |
| | | | 705/44 |
| 2019/0188700 A1 | 6/2019 | August et al. | |
| 2019/0236606 A1 | 8/2019 | Padmanabhan et al. | |

(Continued)

*Primary Examiner* — Dant B Shaifer Harriman
(74) *Attorney, Agent, or Firm* — Moore & Van Allen PLLC; Seongun M. Hong

(57) ABSTRACT

A system is provided for authenticating peer-to-peer resource exchanges using non-fungible tokens. In particular, the system may store, on a distributed register, a secure token (e.g., a non-fungible token) associated with a particular resource. Subsequently, a user who may be the owner of such resource and/or the associated token may wish to execute a peer-to-peer exchange of the resource for a second resource. The system may, in response to receiving the second resource from a second user, initiate a process to transfer ownership of the secure token to the second user. In this way, the system provides an efficient and secure way to conduct peer-to-peer resource exchanges.

20 Claims, 3 Drawing Sheets

(56) References Cited

U.S. PATENT DOCUMENTS

| | | |
|---|---|---|
| 2019/0238316 A1 | 8/2019 | Padmanabhan |
| 2020/0050591 A1 | 2/2020 | Dobrek et al. |
| 2020/0143367 A1 | 5/2020 | LeBeau et al. |
| 2020/0211011 A1 | 7/2020 | Anderson |
| 2020/0273048 A1 | 8/2020 | Andon et al. |
| 2020/0302431 A1 | 9/2020 | Polehn et al. |
| 2021/0256070 A1 | 8/2021 | Tran et al. |
| 2021/0383232 A1 | 12/2021 | Katz et al. |
| 2023/0126016 A1* | 4/2023 | Nelson ............... G06Q 20/3674 705/65 |
| 2023/0306427 A1* | 9/2023 | Unagami ........... G06Q 30/0201 |
| 2023/0394469 A1* | 12/2023 | Vijayan .............. G06Q 20/3672 |

\* cited by examiner

```
                                                    ┌── 300
                                                   ↙
┌─────────────────────────────────────────────────────────────────┐
│  RECEIVE, FROM A FIRST USER, A RESOURCE EXCHANGE REQUEST TO     │
│  EXCHANGE A FIRST RESOURCE ASSOCIATED WITH THE FIRST USER WITH A│
│     SECOND RESOURCE ASSOCIATED WITH A SECOND USER               │
│                          301                                    │
└─────────────────────────────────────────────────────────────────┘
                              │
                              ▼
┌─────────────────────────────────────────────────────────────────┐
│  PROMPT THE FIRST USER TO DIGITALLY SIGN A DATA RECORD USING A  │
│  PRIVATE KEY ASSOCIATED WITH THE FIRST USER, WHEREIN THE DATA RECORD │
│  COMPRISES A SMART CONTRACT CONFIGURED TO AUTOMATICALLY TRANSFER│
│  THE FIRST RESOURCE TO THE SECOND USER UPON RECEIPT OF THE SECOND│
│              RESOURCE FROM THE SECOND USER                      │
│                          302                                    │
└─────────────────────────────────────────────────────────────────┘
                              │
                              ▼
┌─────────────────────────────────────────────────────────────────┐
│      DETECT THAT THE FIRST USER HAS DIGITALLY SIGNED THE DATA RECORD │
│                          303                                    │
└─────────────────────────────────────────────────────────────────┘
                              │
                              ▼
┌─────────────────────────────────────────────────────────────────┐
│         RECEIVE THE SECOND RESOURCE FROM THE SECOND USER        │
│                          304                                    │
└─────────────────────────────────────────────────────────────────┘
                              │
                              ▼
┌─────────────────────────────────────────────────────────────────┐
│  BASED ON DETECTING THAT THE FIRST USER HAS DIGITALLY SIGNED THE DATA│
│  RECORD AND RECEIVING THE SECOND RESOURCE FROM THE SECOND USER, │
│  EXECUTE THE SMART CONTRACT TO AUTOMATICALLY TRANSFER THE FIRST │
│                   RESOURCE TO THE SECOND USER                   │
│                          305                                    │
└─────────────────────────────────────────────────────────────────┘
```

FIG. 3

SYSTEM FOR AUTHENTICATING PEER-TO-PEER RESOURCE EXCHANGE USING NON-FUNGIBLE TOKENS

FIELD OF THE INVENTION

The present disclosure embraces a system for authenticating peer-to-peer resource exchanges using non-fungible tokens.

BACKGROUND

There is a need for an efficient and secure way to execute peer-to-peer exchanges of resources.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for authenticating peer-to-peer resource exchanges using non-fungible tokens. In particular, the system may store, on a distributed register, a secure token (e.g., a non-fungible token) associated with a particular resource. Subsequently, a user who may be the owner of such resource and/or the associated token may wish to execute a peer-to-peer exchange of the resource for a second resource. The system may, in response to receiving the second resource from a second user, initiate a process to transfer ownership of the secure token to the second user. In this way, the system provides an efficient and secure way to conduct peer-to-peer resource exchanges.

Accordingly, embodiments of the present disclosure provide a system for authenticating peer-to-peer resource exchanges using non-fungible tokens, the system comprising a memory device with computer-readable program code stored thereon; a communication device; and a processing device operatively coupled to the memory device and the communication device, wherein the processing device is configured to execute the computer-readable program code to receive, from a first user, a resource exchange request to exchange a first resource associated with the first user for a second resource associated with a second user; prompt the first user to digitally sign a data record using a private key associated with the first user, wherein the data record comprises a smart contract configured to automatically transfer the first resource to the second user upon receipt of the second resource from the second user; detect that the first user has digitally signed the data record; receive the second resource from the second user; and based on detecting that the first user has digitally signed the data record and receiving the second resource from the second user, execute the smart contract to automatically transfer the first resource to the second user.

In some embodiments, the resource exchange request comprises resource exchange data, wherein the resource exchange data identifies the first resource, the second resource, the first user, and the second user.

In some embodiments, the computer-readable program code further causes the processing device to prompt the first user and the second user to provide authentication credentials; receive the authentication credentials from the first user and the second user; compare the authentication credentials with the resource exchange data; and authenticate the first user and the second user based on comparing the authentication credentials with the resource exchange data.

In some embodiments, the resource exchange request is received from a user computing device associated with the first user over a wireless network connection.

In some embodiments, a non-fungible token is associated with the first resource, wherein automatically transferring the first resource to the second resource comprises processing a transaction within the data record to change ownership of the non-fungible token from a distributed register address associated with the first user to a distributed register address associated with the second user.

In some embodiments, the private key is stored within a user computing device associated with the first user, wherein detecting that the first user has digitally signed the data record comprises detecting that the user computing device has digitally signed the data record using the private key.

In some embodiments, the smart contract causes the processing device to transmit the data record to a plurality of distributed register nodes to be appended to a distributed register hosted on the distributed register nodes.

Embodiments of the present disclosure also provide a computer program product for authenticating peer-to-peer resource exchanges using non-fungible tokens, the computer program product comprising at least one non-transitory computer readable medium having computer-readable program code portions embodied therein, the computer-readable program code portions comprising executable portions for receiving, from a first user, a resource exchange request to exchange a first resource associated with the first user for a second resource associated with a second user; prompting the first user to digitally sign a data record using a private key associated with the first user, wherein the data record comprises a smart contract configured to automatically transfer the first resource to the second user upon receipt of the second resource from the second user; detecting that the first user has digitally signed the data record; receiving the second resource from the second user; and based on detecting that the first user has digitally signed the data record and receiving the second resource from the second user, executing the smart contract to automatically transfer the first resource to the second user.

In some embodiments, the resource exchange request comprises resource exchange data, wherein the resource exchange data identifies the first resource, the second resource, the first user, and the second user.

In some embodiments, the computer-readable program code portions further comprise executable portions for prompting the first user and the second user to provide authentication credentials; receiving the authentication credentials from the first user and the second user; comparing the authentication credentials with the resource exchange data; and authenticating the first user and the second user based on comparing the authentication credentials with the resource exchange data.

In some embodiments, the resource exchange request is received from a user computing device associated with the first user over a wireless network connection.

In some embodiments, a non-fungible token is associated with the first resource, wherein automatically transferring the first resource to the second resource comprises processing a transaction within the data record to change ownership of the non-fungible token from a distributed register address associated with the first user to a distributed register address associated with the second user.

In some embodiments, the private key is stored within a user computing device associated with the first user, wherein detecting that the first user has digitally signed the data record comprises detecting that the user computing device has digitally signed the data record using the private key.

In some embodiments, the smart contract comprises executable code portions for transmitting the data record to a plurality of distributed register nodes to be appended to a distributed register hosted on the distributed register nodes.

Embodiments of the present disclosure also provide a computer-implemented method for authenticating peer-to-peer resource exchanges using non-fungible tokens, the computer-implemented method comprising receiving, from a first user, a resource exchange request to exchange a first resource associated with the first user for a second resource associated with a second user; prompting the first user to digitally sign a data record using a private key associated with the first user, wherein the data record comprises a smart contract configured to automatically transfer the first resource to the second user upon receipt of the second resource from the second user; detecting that the first user has digitally signed the data record; receiving the second resource from the second user; and based on detecting that the first user has digitally signed the data record and receiving the second resource from the second user, executing the smart contract to automatically transfer the first resource to the second user.

In some embodiments, the resource exchange request comprises resource exchange data, wherein the resource exchange data identifies the first resource, the second resource, the first user, and the second user.

In some embodiments, the computer-implemented method further comprises prompting the first user and the second user to provide authentication credentials; receiving the authentication credentials from the first user and the second user; comparing the authentication credentials with the resource exchange data; and authenticating the first user and the second user based on comparing the authentication credentials with the resource exchange data.

In some embodiments, the resource exchange request is received from a user computing device associated with the first user over a wireless network connection.

In some embodiments, a non-fungible token is associated with the first resource, wherein automatically transferring the first resource to the second resource comprises processing a transaction within the data record to change ownership of the non-fungible token from a distributed register address associated with the first user to a distributed register address associated with the second user.

In some embodiments, the private key is stored within a user computing device associated with the first user, wherein detecting that the first user has digitally signed the data record comprises detecting that the user computing device has digitally signed the data record using the private key.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
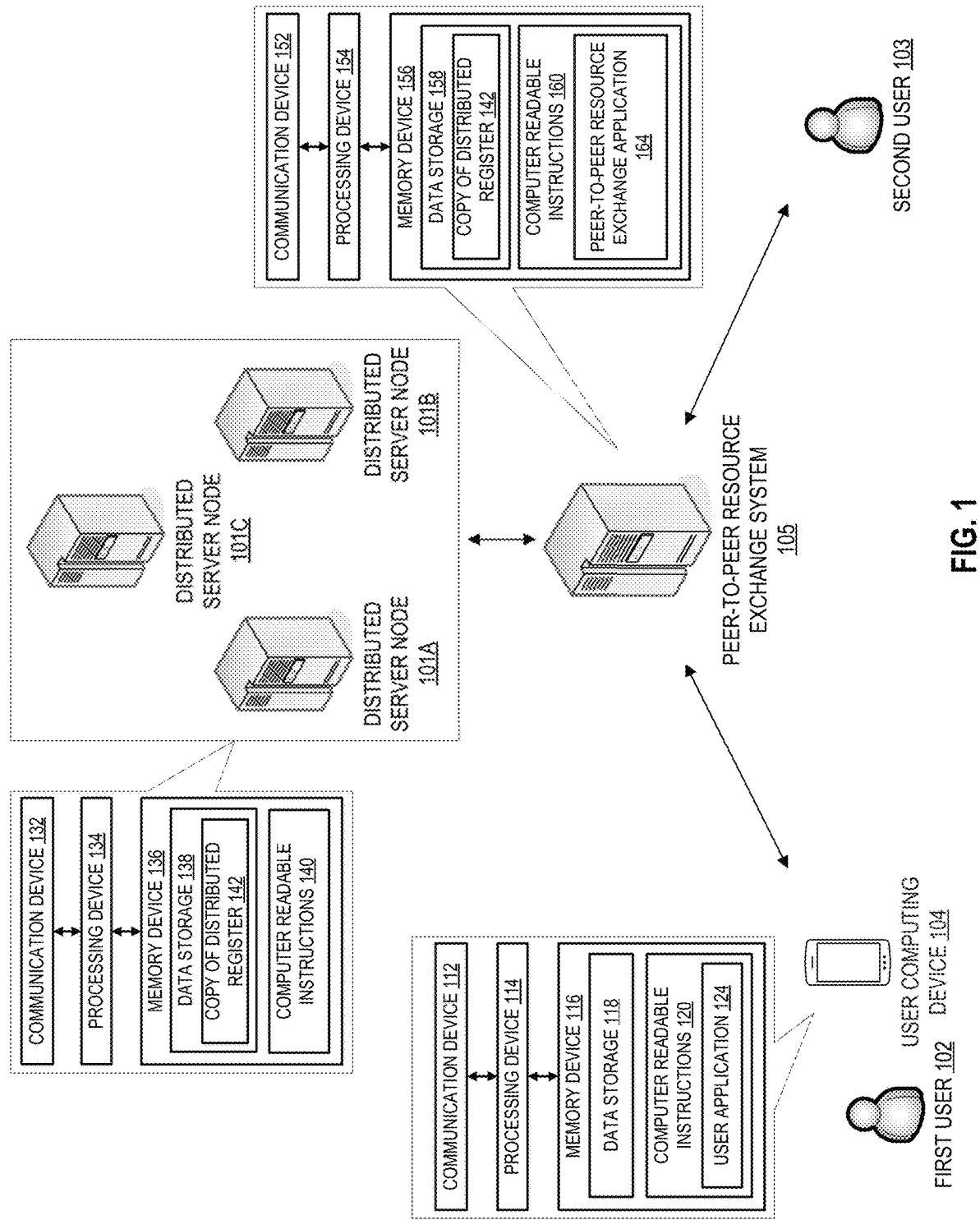
Figure 2:
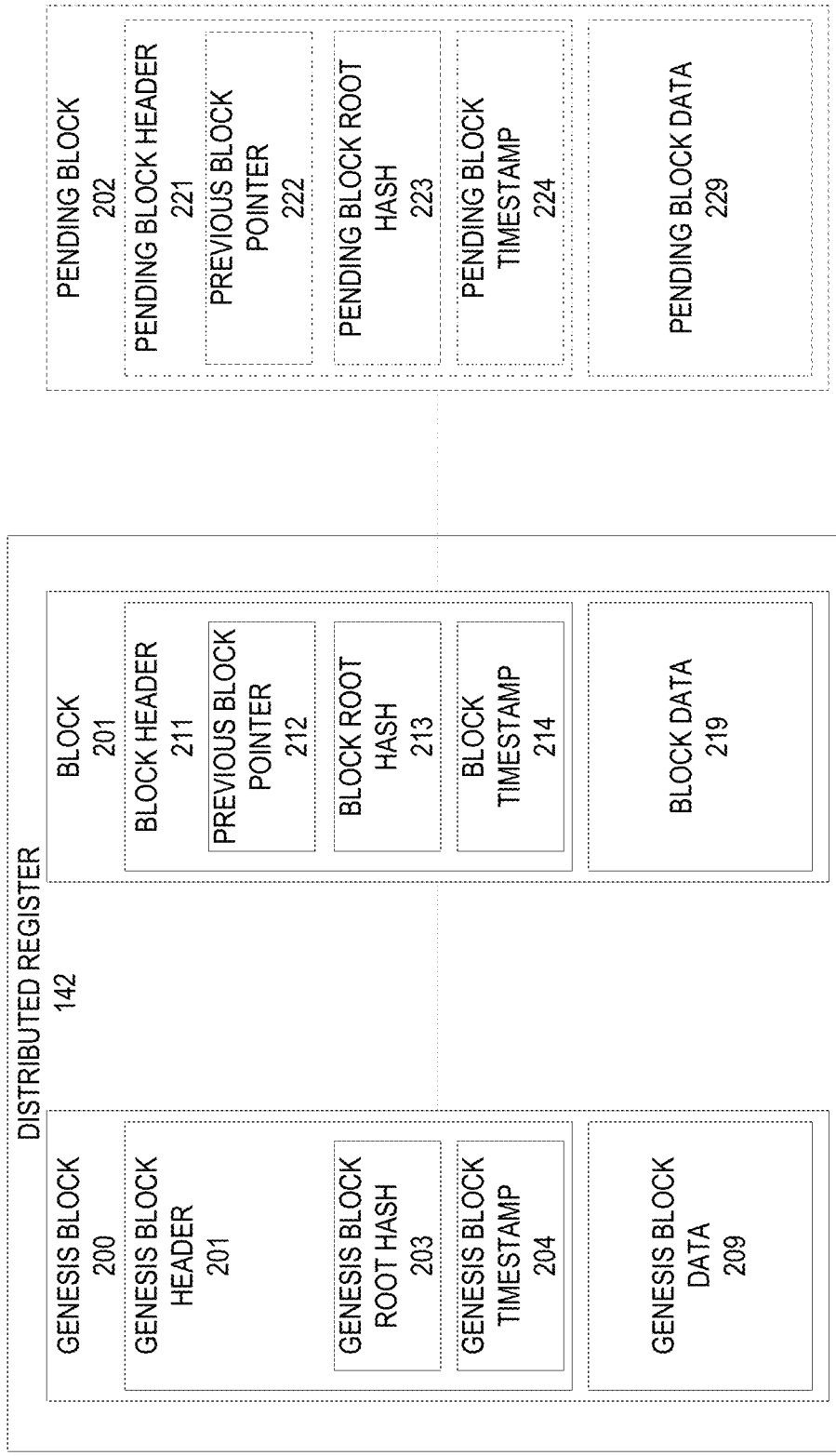

Having thus described embodiments of the invention in general terms, reference will now be made to the accompanying drawings, wherein:

FIG. 1 illustrates an operating environment for the peer-to-peer resource exchange system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process for authenticating peer-to-peer resource exchanges using non-fungible tokens, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Non-fungible token" or "NFT" as used herein may refer to data stored in a distributed register that may comprise a signature (e.g., a hash value or address) associated with a digital resource, where the signature certifies that the digital resource is unique (i.e., not interchangeable with other resources). The signature may further identify the owner of the digital resource (e.g., a user, entity, or the like). In this regard, the ownership of the digital resource may be governed by a smart contract stored within the distributed register and associated with the digital resource and/or the NFT. Examples of such digital resources may include image files, audio files, video files, documents, web pages, and the like. In particular, the digital resource may include a secure token that may serve as a data identifier associated with a particular computing device (e.g., a mobile device). In other embodiments, the signature may identify the owner of a non-digital resource, which may include physical objects (e.g., a tradeable card) and/or non-physical objects (e.g., securities) that may be associated with the signature. In some embodiments, the digital resource may be stored separately from the distributed register (e.g., off-chain on a database server). In other embodiments, the digital resource may be stored within the distributed register (e.g., on-chain within block data).

When conducting peer-to-peer resource exchanges, it may be desirable to participating entities and/or parties to conduct the exchange on a secure and neutral platform. To address this need among others, the system comprises a peer-to-peer resource exchange system that may be configured to authenticate and process peer-to-peer resource exchanges. In this regard, the peer-to-peer resource exchange system may receive a request from a first user and/or a second user to initiate a resource exchange in which a first resource, owned by the first user, is to be exchanged for a second resource, owned by the second user. The peer-to-peer resource exchange system may prompt the first user to transmit the first resource to the peer-to-peer resource exchange system. Subsequently, the peer-to-peer resource exchange system prompt the second user to transmit the second resource to the peer-to-peer resource exchange system.

Once the second resource has been received from the second user, the peer-to-peer resource exchange system may initiate a process to transfer ownership of the first resource to the second user. The first resource may be, for instance, a non-fungible token. In such embodiments, the first user may be prompted to digitally sign a data record using a private key associated with the first user (e.g., via a smart contract). The data record may comprise a transaction which may transfer ownership of the NFT from the first user to the second user. In this regard, the transaction may change the ownership of the NFT to reflect a public key (or address) associated with the second user. Once the data record has been signed using the private key associated with the first user, the system may transmit the data record to be appended to the distributed register. After the data record has been validated by one or more nodes (e.g., hosts of the distributed register), the data record may be appended to the distributed register, thereby officially changing ownership of the NFT from that of the first user to that of the second user. In this way, the system provides a secure way to execute peer-to-peer resource exchanges.

An exemplary use case is provided as follows. It should be understood that the following example is provided for illustrative purposes only and is not intended to reduce or limit the scope of the disclosure. In one embodiment, a first user may wish to exchange a collectible item such as a trading card (e.g., a first resource) for a set amount of currency (e.g., a second resource) owned by a second user. The first user and the second user may use an automated teller machine ("ATM") (e.g., a peer-to-peer resource exchange system) as a neutral platform for the secure exchange of the first resource for the second resource. In this regard, the collectible item may be associated with an NFT stored in a distributed register, where the NFT signifies the authenticity and/or the ownership of the collectible item. Accordingly, the NFT may identify a public address or key associated with the first user as the owner of the NFT and the collectible item.

The ATM may prompt the first user and/or the second user to provide information regarding the resource transfer (or "resource transfer data"). For instance, the information may identify the resources to be transferred (e.g., the type of resource or currency, amount of funds, or the like), time limits or other restrictions on the exchange (e.g., the exchange is valid only up to a certain date), or the like. Based on receiving the input, the ATM may dynamically generate a smart contract based on the information provided by the first user and/or the second user. In some embodiments, the resource transfer data may be inputted into the ATM by the first user and/or the second user. In other embodiments, the resource transfer data may be transmitted to the ATM (either directly or through one or more intermediary computing systems) through a personal computing device of the first user and/or the second user (e.g., a smartphone, personal computer, or the like).

The peer-to-peer resource exchange system may subsequently prompt the first user to transmit the NFT to the peer-to-peer resource exchange system. In this regard, the ATM may prompt the first user to digitally sign a data record containing a transaction to interact with the smart contract, where the smart contract may be configured to automatically transfer ownership of the NFT upon fulfillment of transaction conditions (e.g., receipt of the second resource). In this way, the peer-to-peer resource exchange system may serve as an escrow to facilitate the exchange of resources between the first user and the second user. The first user may digitally sign the data record using a private key associated with the NFT.

Upon receiving the first user's digital signature, the ATM may prompt the second user to transfer the funds (e.g., an agreed upon price for the NFT and the collectible item) to the peer-to-peer resource exchange system. Once the predetermined amount of funds has been received, the peer-to-peer resource exchange system may automatically execute the smart contract, which may then cause a proposed data record to be submitted to the nodes of the distributed register. The proposed data record may comprise a transaction to change the ownership of the NFT from that of the first user to that of the second user. The nodes may then validate the proposed data record to be appended to the distributed register. Once the proposed data record has been appended, the peer-to-peer resource exchange system may present, on the display of the peer-to-peer resource exchange, an alert or notification that identifies the resource exchange as having been completed.

In scenarios in which the second resource has not been completely received (e.g., the second user has not provided enough funds according to the terms of the exchange), the peer-to-peer exchange system may, up to a threshold amount of time, continue to store the NFT until the all of the resources have been received. If the funds have not been received within the designated time (e.g., within 30 minutes), or if the first user or second user provide an input to the peer-to-peer resource exchange system to cancel the exchange, the transaction to change ownership of the NFT will be reverted, thereby releasing the NFT from the smart contract.

The system as described herein confers a number of technological advantages over conventional resource exchange systems. For instance, the peer-to-peer resource exchange system provides a secure and neutral platform on which users may execute the resource exchanges. Furthermore, by storing the transaction information regarding the NFT on a distributed register, users may access an immutable record of the history of the NFT, thereby providing users with knowledge regarding the authenticity of the NFT along with any resources associated therewith.

Turning now to the figures, FIG. 1 illustrates an operating environment 100 for the peer-to-peer resource exchange system, in accordance with one embodiment of the present disclosure. In particular, FIG. 1 illustrates a peer-to-peer resource exchange system 105 in operative communication with a mobile device 105, user computing device 104, and plurality of distributed server nodes 101A, 101B, 101C over a network. In such a configuration, the computing systems within the network, including the peer-to-peer resource exchange system 105, distributed server nodes 101A, 101B, 101C, and user computing device 104, may transmit data to and/or receive data from one another through the network.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts three distributed server nodes 101A, 101B, 101C, the operating environment may comprise a greater or fewer number of distributed server nodes depending on the embodiment. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the peer-to-peer resource exchange system 105 may be a computing system (which may be operated by an entity associated with one or more users, such as a financial institution) that performs the peer-to-peer resource exchange functions as described herein. In particular, the peer-to-peer resource exchange system 105 may be configured to process resources exchanges between a first user 102 and a second user 103. Accordingly, the peer-to-peer resource exchange system 105 may comprise a processing device 154 operatively coupled to a communication device 152 and a memory device 156. The memory device 156 may comprise data storage 158 and computer readable instructions 160 stored thereon, where the computer readable instructions 160 may comprise a peer-to-peer resource exchange application 164. The data storage 158 of the peer-to-peer resource exchange system 105 may comprise a copy of a distributed register 142, where said distributed register may store information regarding peer-to-peer exchanges, such as non-fungible tokens (which may be associated with one or more resources), historical exchange data, user account information (e.g., public keys and/or addresses), or the like.

The peer-to-peer resource exchange application 164 may, when executed by the processor 154 of the peer-to-peer resource exchange system 105, cause the processor 154 to perform the various processing functions related to peer-to-peer resource exchanges, which may include authenticating the first user 102, the user computing device 104, and/or the second user 103, receiving resources from the first user 102, the user computing device 104, and/or the second user 103, transferring resources, interacting with the distributed register (e.g., to read NFT data, execute smart contracts, and the like), and the like.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the distributed server nodes 101A, 101B, 101C may, in combination with the peer-to-peer resource exchange system 105, form a cluster of nodes that host a distributed register on which digital resources (e.g., NFT's) may be stored. Accordingly, the distributed server nodes 101A, 101B, 101C may each comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142), as described elsewhere herein, may comprise a series of data records relevant to the objectives of an entity associated with the distributed server network 109. In this regard, the distributed server node 101, along with any other computing systems that host a copy of the distributed register 142 (e.g., the peer-to-peer resource exchange system 105), may be able to read data from the distributed register, submit data records to the distributed register, participate in consensus mechanisms, or the like.

As further illustrated in FIG. 1, the user computing device 104 may be in operative communication with the distributed server nodes 101A, 101B, 101C and/or the peer-to-peer resource exchange system 105. The user computing device 104 may be a device that may be owned and/or operated by a user (e.g., the first user 102 or the second user 103) for the purpose of facilitating the resource exchange process. In particular, the user computing device 104 may be a portable device such as a smartphone which may be used to transfer resource exchange data (e.g., information about the parties, the resources to be exchanged, conditions for the exchange, and the like) to the peer-to-peer resource exchange system 105. In some embodiments, the user computing device 104 may further be used (e.g., by the first user 102) to digitally sign data records regarding the transfer of ownership of an NFT. In this regard, the first user 102 may use the user computing device 104 to digitally sign, via a private key stored within the user computing device 104, to sign a data record comprising smart contract logic to automatically transfer an NFT belonging to the first user 102 to the second user 103 upon detecting that the second user 103 has relinquished the second resource to the peer-to-peer resource exchange system 105.

Accordingly, the user computing device 104 may comprise a communication device 112, a processing device 114, and a memory device 116. In some embodiments, the mobile device 105 may comprise hardware and/or software components that allow the mobile device 105 to interface with the user 106. In such embodiments, the mobile device 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the mobile device 105 may further comprise data storage 118 and computer-readable instructions 120 stored thereon, where the computer-readable instructions 120 may comprise a user application 124. The user application 124 may be a software application that allows the first user 102 to initiate resource exchanges, provide resource exchange data, digitally sign transactions, track resource exchange progress, and the like. To this end, the user computing device 104 may use one or more of various communication channels (e.g., wireless communication channels) to communicate with the peer-to-peer resource exchange system 105 throughout the resource exchange process, such as Wi-Fi, NFC, cellular signals, or the like.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents, or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process flow 300 for authenticating peer-to-peer resource exchanges using non-fungible tokens, in accordance with one embodiment of the present disclosure. The process begins at block 301, where the system receives, from a first user, a resource exchange request to exchange a first resource associated with the first user with a second resource associated with a second user. In this regard, the peer-to-peer resource exchange platform may provide the first user and second user with a neutral platform for authenticating and processing the exchange. In an exemplary embodiment, the first user may wish to exchange the first resource (e.g., an intangible object such as digital art or media, or tangible object such as a collectible item) with a second resource (e.g., an amount of funds according to the terms of the exchange) belonging to a second user. The first resource may be associated with a non-fungible token that is stored within a distributed register across a plurality of nodes. In such embodiments, the non-fungible token may be used to transfer ownership of the non-fungible token and the first resource to the second user.

Accordingly, the first user may initiate the resource exchange request by interacting with the peer-to-peer resource exchange platform. In some embodiments, the request may be submitted through a user computing device associated with the first user (e.g., a smartphone of the first user). In such an embodiment, the first user may enter resource exchange data (e.g., data identifying the types and/or amounts of the resources to be exchanged, the parties to the exchange, other exchange terms such as time limits or timeframes, or the like) into the user computing device such that the resource exchange data may be transmitted from the user computing device to the peer-to-peer resource exchange platform (e.g., over a wireless connection). In other embodiments, the resource exchange data may be entered into the peer-to-peer resource exchange platform directly using one or more input devices associated with the peer-to-peer resource exchange platform (e.g., touchscreens, keypads, keyboards, or the like).

In some embodiments, the peer-to-peer resource exchange system may authenticate the first user and/or the second user in response to receiving the resource exchange request (e.g., by reading the information regarding participants from the resource exchange data). In this respect, the peer-to-peer resource exchange system may prompt the first user and/or the second user for authentication credentials (e.g., a username and password, PIN, biometric data, or the like) before allowing the first user and/or the second user to use the peer-to-peer resource exchange system. The users may be authenticated directly on the peer-to-peer resource exchange system (e.g., by interacting with the input devices on the peer-to-peer resource exchange system) or through intermediate devices (e.g., user computing devices). Once the authentication credentials have been received from both users, the peer-to-peer resource exchange system may proceed with the resource exchange process.

The process continues to block 302, where the system prompts the first user to digitally sign a data record using a private key associated with the first user, wherein the data record comprises a smart contract configured to automatically transfer the first resource to the second user upon receipt of the second resource from the second user. In this regard, automatically transferring the first resource to the second user may comprise submitting a data record to the nodes of the distributed register, where the data record may comprise a transaction to change the ownership of the NFT from a distributed register address associated with the first user to a distributed register address associated with the second user.

The process continues to block 303, where the system detects that the first user has digitally signed the data record. The first user may digitally sign the data record, for instance, by interacting with the peer-to-peer resource exchange system through an application installed on a user computing device owned by the first user (e.g., a smart phone). The user computing device may have a private key stored thereon which may be associated with the distributed register address of the first user (e.g., a public key). Accordingly, the user computing device may be used by the first user to digitally sign the data record using the private key stored thereon. By signing the data record, the NFT belonging to the first user may be transferred to the digital register address associated with the second user (e.g., the second user's public key) upon fulfillment of the conditions of the resource exchange.

The process continues to block 304, where the system receives the second resource from the second user. The peer-to-peer resource exchange system, as described elsewhere, may be a computing device operated by an entity (e.g., a financial institution). Accordingly, the peer-to-peer resource exchange system may be configured to receive the second resource in multiple different formats. For instance, the second resource (e.g., funds in the amount of the agreed upon total) may be transferred to the peer-to-peer resource exchange system through a mobile transaction initiated by the second user through a user computing device owned and/or associated with the second user. In this regard, the second user may, through an application associated with the entity (e.g., a financial institution application) may transfer the second resource to the peer-to-peer resource exchange system through online methods.

The process concludes at block 305, where the system, based on detecting that the first user has digitally signed the data record and receiving the second resource from the second user, executes the smart contract to automatically transfer the first resource to the second user. Once the first user has digitally signed the data record and the second user has transmitted the second resource to the peer-to-peer exchange system, the peer-to-peer exchange system may detect that all of the conditions for the smart contract have been fulfilled. Accordingly, executing the smart contract may cause the data record to be submitted to the nodes of the distributed register. Once the nodes validate the data record, the data record may be permanently appended to the distributed register, thereby signifying that the transfer of ownership of the NFT and the first resource has been completed. In this way, the system provides a secure way to coordinate resource exchanges between users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating peer-to-peer resource exchanges using non-fungible tokens, the system comprising:
    a memory device with computer-readable program code stored thereon;
    a communication device; and
    a processing device operatively coupled to the memory device and the communication device, wherein the processing device is configured to execute the computer-readable program code to:
        receive, from a first user, a resource exchange request to exchange a first resource associated with the first user for a second resource associated with a second user;
        prompt the first user to digitally sign a data record using a private key associated with the first user, wherein the data record comprises a smart contract configured to automatically transfer the first resource to the second user upon receipt of the second resource from the second user, wherein the smart contract is dynamically generated based on resource transfer data received from the first user and the second user, wherein the resource transfer data comprises a second resource type, second resource amount, and a time limit;
        detect that the first user has digitally signed the data record;
        receive the second resource from the second user; and
        based on detecting that the first user has digitally signed the data record and receiving the second resource from the second user, execute the smart contract to automatically transfer the first resource to the second user.

2. The system according to claim 1, wherein the resource exchange request comprises resource exchange data, wherein the resource exchange data identifies the first resource, the second resource, the first user, and the second user.

3. The system according to claim 2, wherein the computer-readable program code further causes the processing device to:
    prompt the first user and the second user to provide authentication credentials;
    receive the authentication credentials from the first user and the second user;
    compare the authentication credentials with the resource exchange data; and
    authenticate the first user and the second user based on comparing the authentication credentials with the resource exchange data.

4. The system according to claim 1, wherein the resource exchange request is received from a user computing device associated with the first user over a wireless network connection.

5. The system according to claim 1, wherein a non-fungible token is associated with the first resource, wherein automatically transferring the first resource to the second resource comprises processing a transaction within the data record to change ownership of the non-fungible token from a distributed register address associated with the first user to a distributed register address associated with the second user.

6. The system according to claim 1, wherein the private key is stored within a user computing device associated with the first user, wherein detecting that the first user has digitally signed the data record comprises detecting that the user computing device has digitally signed the data record using the private key.

7. The system according to claim 1, wherein the smart contract causes the processing device to transmit the data record to a plurality of distributed register nodes to be appended to a distributed register hosted on the distributed register nodes.

8. A computer program product for authenticating peer-to-peer resource exchanges using non-fungible tokens, the computer program product comprising at least one non-transitory computer readable medium having computer-readable program code portions embodied therein, the computer-readable program code portions comprising executable portions for:
    receiving, from a first user, a resource exchange request to exchange a first resource associated with the first user for a second resource associated with a second user;
    prompting the first user to digitally sign a data record using a private key associated with the first user, wherein the data record comprises a smart contract configured to automatically transfer the first resource to the second user upon receipt of the second resource from the second user, wherein the smart contract is dynamically generated based on resource transfer data received from the first user and the second user, wherein the resource transfer data comprises a second resource type, second resource amount, and a time limit;
    detecting that the first user has digitally signed the data record;
    receiving the second resource from the second user; and
    based on detecting that the first user has digitally signed the data record and receiving the second resource from the second user, executing the smart contract to automatically transfer the first resource to the second user.

9. The computer program product of claim 8, wherein the resource exchange request comprises resource exchange data, wherein the resource exchange data identifies the first resource, the second resource, the first user, and the second user.

10. The computer program product of claim 9, wherein the computer-readable program code portions further comprise executable portions for:
    prompting the first user and the second user to provide authentication credentials;

receiving the authentication credentials from the first user and the second user;

comparing the authentication credentials with the resource exchange data; and authenticating the first user and the second user based on comparing the authentication credentials with the resource exchange data.

11. The computer program product of claim 8, wherein the resource exchange request is received from a user computing device associated with the first user over a wireless network connection.

12. The computer program product of claim 8, wherein a non-fungible token is associated with the first resource, wherein automatically transferring the first resource to the second resource comprises processing a transaction within the data record to change ownership of the non-fungible token from a distributed register address associated with the first user to a distributed register address associated with the second user.

13. The computer program product of claim 8, wherein the private key is stored within a user computing device associated with the first user, wherein detecting that the first user has digitally signed the data record comprises detecting that the user computing device has digitally signed the data record using the private key.

14. The computer program product of claim 8, wherein the smart contract comprises executable code portions for transmitting the data record to a plurality of distributed register nodes to be appended to a distributed register hosted on the distributed register nodes.

15. A computer-implemented method for authenticating peer-to-peer resource exchanges using non-fungible tokens, the computer-implemented method comprising:

receiving, from a first user, a resource exchange request to exchange a first resource associated with the first user for a second resource associated with a second user;

prompting the first user to digitally sign a data record using a private key associated with the first user, wherein the data record comprises a smart contract configured to automatically transfer the first resource to the second user upon receipt of the second resource from the second user, wherein the smart contract is dynamically generated based on resource transfer data received from the first user and the second user, wherein the resource transfer data comprises a second resource type, second resource amount, and a time limit;

detecting that the first user has digitally signed the data record;

receiving the second resource from the second user; and based on detecting that the first user has digitally signed the data record and receiving the second resource from the second user, executing the smart contract to automatically transfer the first resource to the second user.

16. The computer-implemented method of claim 15, wherein the resource exchange request comprises resource exchange data, wherein the resource exchange data identifies the first resource, the second resource, the first user, and the second user.

17. The computer-implemented method of claim 16, wherein the computer-implemented method further comprises:

prompting the first user and the second user to provide authentication credentials;

receiving the authentication credentials from the first user and the second user;

comparing the authentication credentials with the resource exchange data; and authenticating the first user and the second user based on comparing the authentication credentials with the resource exchange data.

18. The computer-implemented method of claim 15, wherein the resource exchange request is received from a user computing device associated with the first user over a wireless network connection.

19. The computer-implemented method of claim 15, wherein a non-fungible token is associated with the first resource, wherein automatically transferring the first resource to the second resource comprises processing a transaction within the data record to change ownership of the non-fungible token from a distributed register address associated with the first user to a distributed register address associated with the second user.

20. The computer-implemented method of claim 15, wherein the private key is stored within a user computing device associated with the first user, wherein detecting that the first user has digitally signed the data record comprises detecting that the user computing device has digitally signed the data record using the private key.

\* \* \* \* \*